(12) United States Patent
Niese

(10) Patent No.: US 6,733,269 B2
(45) Date of Patent: May 11, 2004

(54) COMPRESSION MOLD TOOL

(75) Inventor: Richard B. Niese, Richmond, MA (US)

(73) Assignee: Marland Mold, Inc., Pittsfield, MA (US)

( * ) Notice: Subject to any disclaimer, the term of this patent is extended or adjusted under 35 U.S.C. 154(b) by 197 days.

(21) Appl. No.: 10/119,356

(22) Filed: Apr. 9, 2002

(65) Prior Publication Data

US 2003/0190385 A1 Oct. 9, 2003

(51) Int. Cl.[7] .............................................. B29C 43/50
(52) U.S. Cl. ........................ 425/350; 425/418; 425/438; 425/809; 425/DIG. 58
(58) Field of Search ................................ 425/350, 418, 425/414, 422, 438, 441, DIG. 58

(56) References Cited

U.S. PATENT DOCUMENTS

| | | | | |
|---|---|---|---|---|
| 3,156,008 | A | * 11/1964 | Martin | ........................ 425/422 |
| 3,718,419 | A | * 2/1973 | Adamo | ........................ 425/438 |
| 3,905,416 | A | * 9/1975 | Hammer | ........................ 264/318 |
| 5,310,797 | A | 5/1994 | White et al. | |
| 5,554,327 | A | 9/1996 | Ingram | |
| 5,603,873 | A | 2/1997 | Ingram | |
| 5,670,000 | A | 9/1997 | Colson et al. | |
| 5,770,130 | A | 6/1998 | Ingram | |
| 5,866,177 | A | 2/1999 | Ingram | |
| 5,885,408 | A | 3/1999 | Kaminski | |
| 5,932,155 | A | 8/1999 | Ingram | |
| 5,989,007 | A | 11/1999 | Ingram | |
| 6,074,583 | A | 6/2000 | Ingram | |
| 6,123,880 | A | 9/2000 | Ingram | |
| 6,602,065 | B1 | * 8/2003 | Ingram | ........................ 425/418 |

* cited by examiner

Primary Examiner—Robert Davis
Assistant Examiner—Thu Khanh T. Nguyen
(74) Attorney, Agent, or Firm—Hedman & Costigan, P.C.

(57) ABSTRACT

An improved mold tool for use in molding machines comprising a mold tool having a core and a stripper sleeve which move in vertical relation to one another for stripping a threaded molded part, the improvement comprising a race on one of said core or said stripper sleeve, a rotating stripper bushing which rotates within said stripper sleeve in relation to said race so that the vertical movement between said stripper sleeve and said core results in rotation of said rotating stripper bushing.

13 Claims, 4 Drawing Sheets

COMPRESSION MOLD TOOL

BACKGROUND OF THE INVENTION

1. Field of the Invention

The present invention relates to a compression mold tool for use in the compression molding of plastic articles. More particularly, the present invention relates to a mold tool for use in the compression molding of threaded plastic articles, such as plastic closures, which allows the article to be mechanically unscrewed from the mold core.

2. Description of the Related Art

Several methods exist for forming plastic articles. Some of the more common and efficient methods for forming high volumes of plastic articles involve molding, either by injection molding or compression molding, where the plastic article is formed within a mold of the article.

Where injection molding involves the injection of high temperature, molten plastic into a mold, compression molding takes place by compressing a warm plastic pellet between mold parts to form the article. Some patents which describe the compression molding process and apparatus for carrying out compression molding include U.S. Pat. Nos. 5,554,327; 5,603,873; 5,770,130; 5,866,177; 5,989,007; 6,074,583 and 6,123,880.

As disclosed by the aforementioned United States patents, apparatus for compression molding articles generally comprise a plurality of molding tools mounted in a circumferential array on a rotatable turret in a plurality of opposed mold parts in tooling pairs. The upper and lower tooling of each pair carry opposed male and female mold parts that together, when closed, form a cavity mold for compression molding the desired article.

The turret is mounted on a machine frame that also carries cams for operative engagement with the tool parts. The cams move the mold parts of each tooling pair toward each other during a portion of the rotation of the turret around the turret axis, for compression molding an article between the tooling pairs, and move the tooling pairs away from each other during another portion of the rotation of the turret. The separation of the tool parts exposes the article molded between the upper and the lower mold parts for release of the article from the upper mold part.

After the mold parts separate, an actuator pushes down on a stripper sleeve to physically push the cap off of the upper mold part. Because the stripper sleeve merely pushes the threaded article off of the mold part, without unscrewing the threaded article from the threads on the upper mold part, the parameters of the threaded part are limited.

The type of compression molding apparatus currently in use generally allow the user to mold closures with a thread profile that is not less than about 30° to 35° and a thread projection of less than about 0.045 inches. Closures with lesser thread profiles or greater thread projections generally cannot be compression molded because they will be damaged by the cavity stripping cycle involved in the operation of conventional apparatus.

Thus, it is desirable to provide a mold tool for molding threaded plastic closures with lesser thread profiles and greater thread projections than those heretofore possible. It is also desirable to provide an improved mold tool that can be retrofitted to and used with existing compression molding apparatus. It is also desirable to provide a mold tool that eliminates the need for specialized rotary compression molding equipment. It is the object of the present invention to meet said needs.

SUMMARY OF THE INVENTION

These and other objects are achieved by the present invention which is directed to an improvement in a compression mold tool for forming a threaded plastic article having an upper mold part on a stationary core, a lower mold part and a stripper sleeve which is actuated for pushing the article off of the upper mold part, said improvement comprising a rotating inner sleeve which engages the article and a threaded portion on the stationary core for turning said rotating inner sleeve when said stripper sleeve is actuated.

BRIEF DESCRIPTION OF DRAWINGS

The following drawings, in which like reference characters indicate like parts, are included for illustration of the present invention without limiting the invention in any manner whatsoever, wherein.

DETAILED DESCRIPTION OF THE PREFERRED EMBODIMENT

Figure 1:
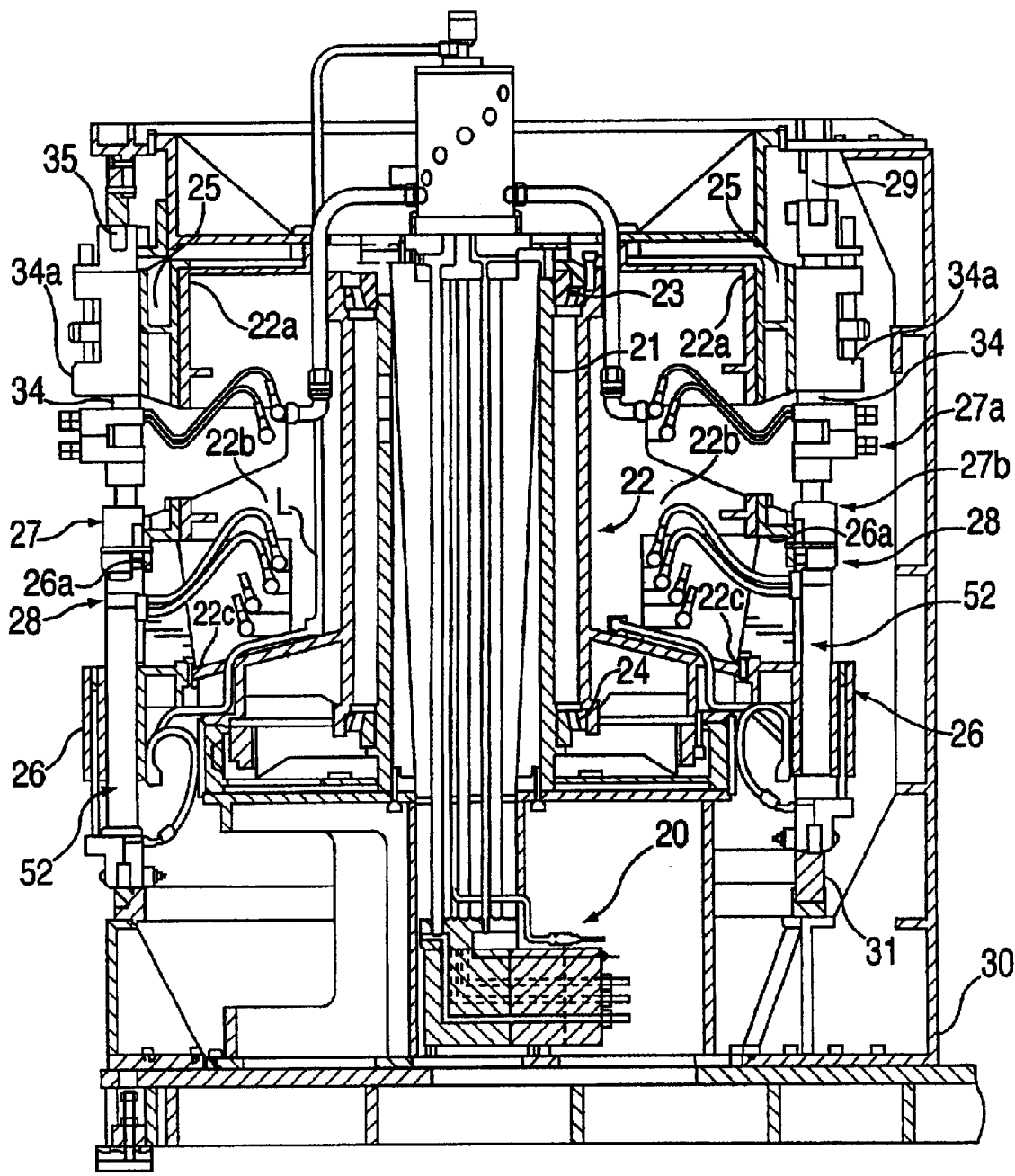
FIG. 1 is a cross-sectional view of a compression molding apparatus of the prior art for compression molding articles as set forth in U.S. Pat. No. 5,989,007.
Figure 2:
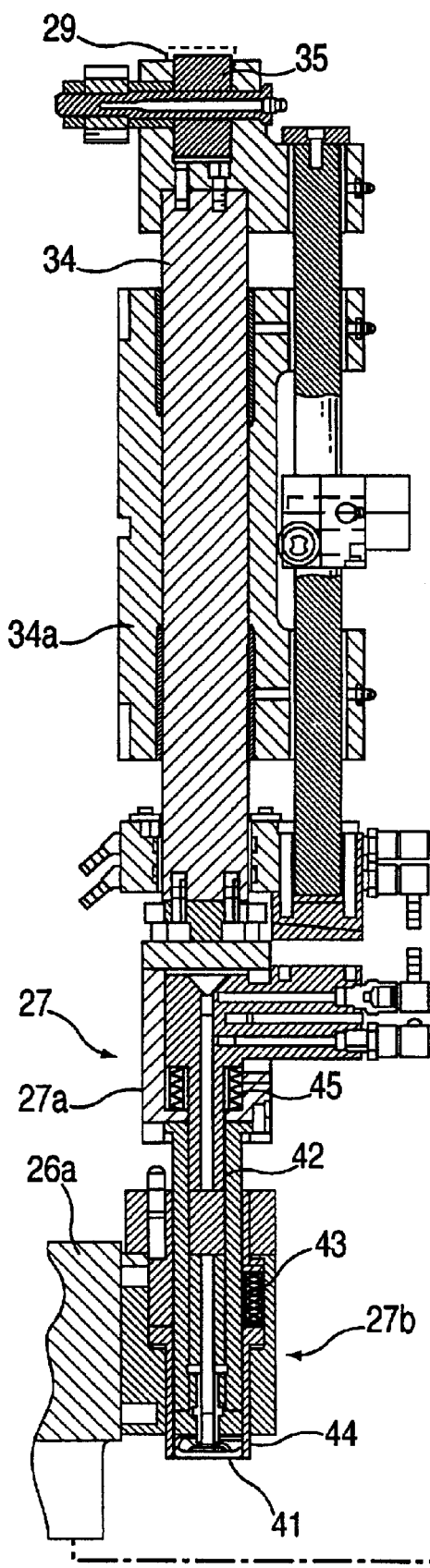
FIG. 2 is an expanded cross-sectional view of the upper and lower tooling parts of the compression molding apparatus of FIG. 1.
Figure 2:
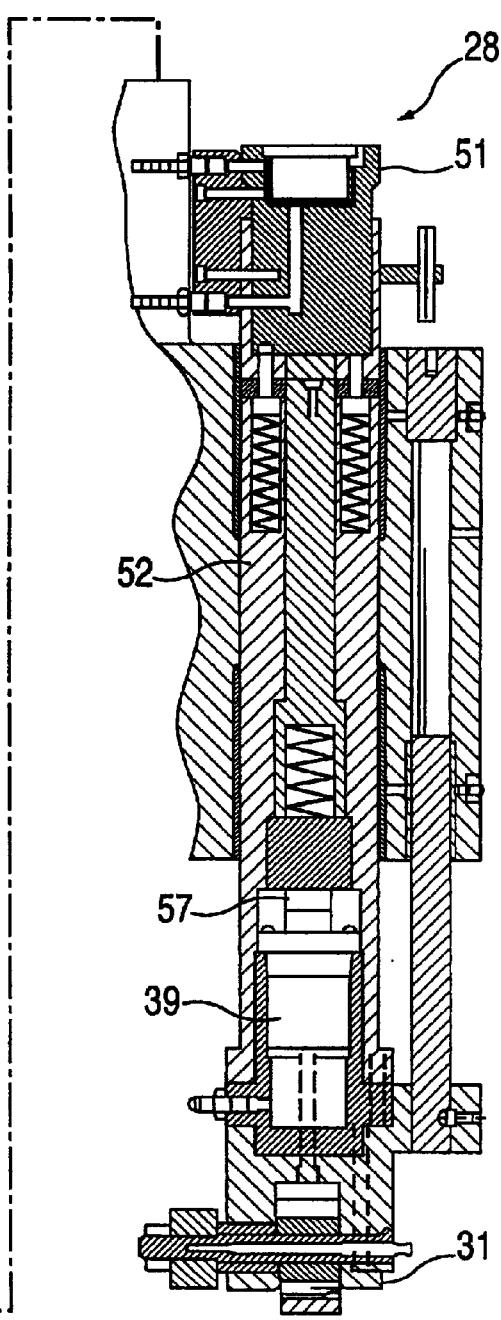

In the preferred embodiment, shown in the drawings attached hereto, the present invention comprises the following:

Referring to FIGS. 1 and 2, a typical compression molding apparatus is a rotary apparatus that includes a base 20 supporting a column 21 on which a turret 22 is rotatably mounted by upper and lower tapered bearings 23, 24. The turret 22 includes vertically spaced supports comprising an annular upper support 22a, an annular intermediate support 22b, and a annular lower support 22c. A plurality of upper support segments 25 are mounted on the annular upper supports 22a and abut to define a ring. A plurality of lower segments 26 are mounted on the annular intermediate and lower supports 22b, 22c and abut to define a ring. Each segment 26 supports one or more actuators 52 adjacent the lower end of the apparatus. Actuators 34 are mounted for vertical movement in housing 34a mounted upon support segments 25 that, in turn, are supported on the annular upper support 22a.

An upper set of tooling 27 is associated with each actuator 34 and includes a movable assembly 27a mounted on the lower end of each actuator 34 and a fixed assembly 27b mounted on a portion 26a of segment 26 that is fixed to the intermediate support 22b. A fixed annular cam 29 is supported by columns 30 and is associated with the upper actuators 34. The actuator 34, in turn, has a cam roller 35 at its upper end for engaging the cam 29.

In FIG. 2, the fixed assembly 27b is mounted on a segment portion 26a of the segment 26. The movable assembly 27a comprises a mold-forming core 41, a spring loaded core sleeve 42 urged upwardly by springs 45 and an outer sleeve 44 urged downwardly by stripper springs 43. The mold-forming core 41 defines a male mold.

A set of lower tooling 28 is mounted on each lower actuator 52. A fixed annular cam 31 is supported on a base 20 and is associated with the lower actuators 52. Each lower assembly 28 of tooling includes a female mold assembly 51.

The operation of compression molding apparatuses is well known in the art. The operation generally comprises the closing of the mold after a pellet of thermoplastic material is delivered to the female mold. Thereafter, the lower tool actuator 52 is raised a fixed stroke by the lower cam 31, and the cavity 51 contacts the outer stripper sleeve 44 of the upper tooling mold forcing it upward against springs 43 for the remainder of the lower tooling upward stroke.

Once the mold is closed, the upper tooling is lowered a fixed stroke to form the part, as controlled by the fixed upper forming cam 29. When the forming pressure increases to equal the force of the gas or hydraulic cylinder 39, then the piston 57 of the gas or hydraulic cylinder 39 moves to limit the molding force on the tooling. This forces the cavity 51 to lower, and causes the outer sleeve springs 43 to move the outer sleeve 44 downward in unison with the cavity 51, until the upper tool stroke is completed.

The next cycle in the operation is cavity stripping. During stripping of the molded closure from the cavity 51, the lower tooling actuator 52 is lowered, leaving the formed plastic closure on the male mold-forming core 41. The article is stripped off of the core in one of two ways, depending on the molding apparatus.

In one, shown in FIGS. 1 and 2, the resistance of the closure to stripping from the threads causes the core 41 to stay down, until its lost motion with the core sleeve 42 is taken up. At this time, the core 41 is withdrawn in a vertical upwardly direction by the action of the core sleeve 42, causing the core sleeve 42 to compress the array of core sleeve springs 45. The result is that the part is stripped from the core 41 as the outer sleeve springs 43 overcome the stripping force of the outer stripper sleeve 44 which is maintained stationary. In doing so, the stationary stripper sleeve 44 forces the article off of the moving core 41.

In an alternative method, the stripper sleeve 44 moves downwardly in relation to a stationary core 41. Where a threaded closure has been molded, normally the stripper outer sleeve springs 43 would not overcome the closure strip force required, and would remain compressed. Thus, the outer stripper sleeve 44 would not move down without assistance. In this case the male mold core 41 is maintained stationary and the stripper sleeve 44 is actuated in a vertically downward direction to push the article off of the core 41 thereby stripping the threaded closure from the mold In a preferred embodiment, shown in FIG. 3 attached hereto, the present invention 127 comprises a stripper sleeve 208, a stationary core 200 having a helix shaped upper ball bearing race 280 and a lower helix shaped ball bearing race 202, with an attached male forming mold core 141 and a lower rotating stripper bushing 220 for the mechanical unscrewing of compressed plastic mold parts 204.

Figure 3:
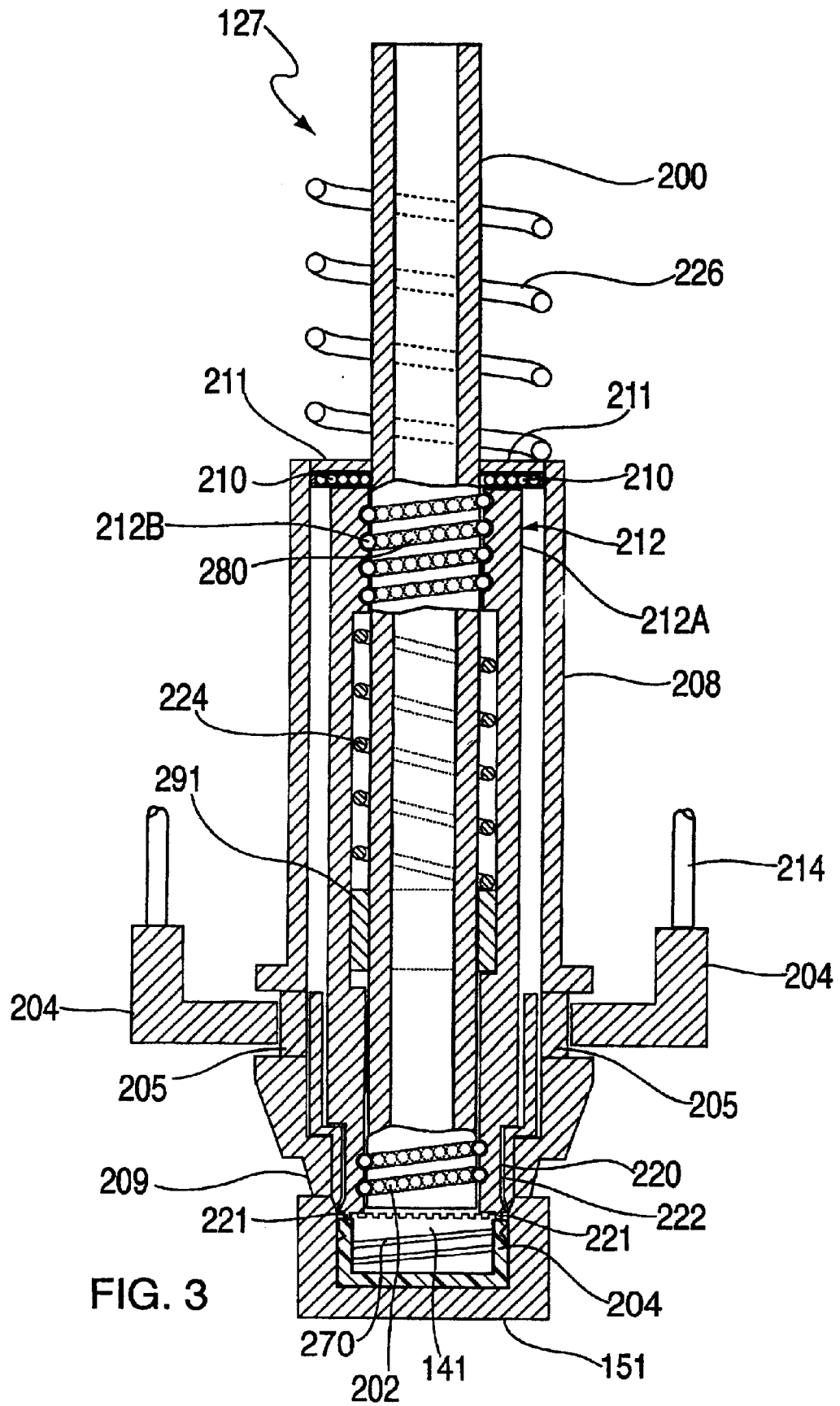
FIG. 3 is a cross-sectional view of an upper mold tooling which comprises an embodiment of the present invention, showing a stripper sleeve with an inner rotating stripper bushing in the neutral position with a molded part in the compression configuration prior to stripping.

In the preferred embodiment of FIG. 3, the improved compression mold tool 127 may be attached to any suitable compression molding machine. For example, a machine that has been found preferable comprises a plurality of molding tools mounted circumferentially on a rotable turret style device. Preferably, such a machine has corresponding female style mold 151 and an actuator 204 to engage a stripper sleeve 208 driven by a stripping cam 214. As in the prior art, the improved compression mold tool 127 would be positioned to receive a thermoplastic material plug to form a molded part 204 in a turret styled compression mold machine. The improved compression mold tool 127 would then be utilized to make compression molded round parts 204 with internal/external threads of various sizes.

The male forming mold core 141 end of the stationary core 200 has mold threads 270 along at least the portion of the end to be received by the female mold 151. The threads 270 are shaped in a predetermined helix fashion which imparts an identical thread on the thermoplastic material of a molded part 204. Following along the stationary core 200, and proximate to the helix shaped threading 270 of the male forming mold core 141, is an identical helix shaped lower ball bearing race 202, having ball bearings 222 which are surrounded by the lower rotating stripper bushing 220. The lower rotating stripper bushing 220 surrounds the area immediately adjacent the male forming mold core 141 end of the stationary core 200 and rotates on the lower ball bearing race 202.

In the preferred embodiment shown in FIG. 3, wherein stripping occurs by downward activation of the stripper sleeve 208, the stripping is initiated when a stripping cam 214 is activated within the molding sequence. When the stripping cam 214 proceeds with downward force against the actuator 204, the improved compression mold tool 127 begins its novel function. In the present invention, the vertical motion of the stripper sleeve 208 is transferred to the lower rotating stripper bushing 220 which turns in a circular motion.

In the preferred embodiment shown in FIG. 3, the stripper sleeve 208 comprises a shell which surrounds the stationary core 200. The stripper sleeve 208 can move vertically up and down relative to the stationary core 200, and is held in position by an internal spring 224 and upper external spring 226. The stripper sleeve 208 has a bullet type profile, wherein the area closest to the molded part 204 is tapered to the female mold 151, thereby forming the stripper sleeve tapered end 209. From this point the stripper sleeve 208 widens as it proceeds along the stationary core 200. Within this widened region and proximate to the stripper sleeve tapered end 209 the stripper sleeve 208 comprises a rutted area forming a drive collar 205 which encircles the exterior of the stripper sleeve 208.

Any known method for activating the stripper sleeve 208 may be used, however in a preferred embodiment, shown in FIG. 3, an actuator 204 fitted to the drive collar 205 has been found to be suitable. Said actuator 204 is set into motion by a stripping cam 214 from a suitable compression mold machine as is known in the art.

In the preferred embodiment shown in FIG. 3, the stripper sleeve 208 further comprises a closed end plate 211 opposite the tapered end 209 to close the terminal end of the stripper sleeve 208, having a hole that allows the stripper sleeve 208 to receive the stationary core 200.

Any known method for maintaining the position of the striping sleeve 208 on the stationary core 200 may be used, such as hydraulic pistons, actuators or suitable springs. However, a design which has been found to be suitable includes the use of offsetting tension springs. In the preferred embodiment shown, the stripping sleeve 208 maintains a neutral position by the equalizing forces of an internal spring 224 and upper external spring 226.

The internal spring 224 is coiled around the stationary core 200 and exerts pressure away from the area where the molded part 204 is stripped. The internal spring 224 is positioned between the core collar 291 and the upper rotating bushing 212. The core collar 291 is affixed to the stationary core 200 adjacent the male forming mold core 141 and above the lower rotating stripper bushing 220. When the stripper sleeve 208 is set in motion, the internal spring 224 becomes compressed between the upper rotating bushing 212 and the core collar 291. After the stripping cam 214 has stopped exerting pressure on actuator 204 around the drive collar 205 the internal spring 224 brings the stripper sleeve 208 back to its neutral position by force placed on the upper rotating bushing 212, internal collar 210 and closed end plate 211.

In the preferred embodiment shown in FIG. 3, the position of the stripper sleeve 208 is further maintained by the use of an upper external spring 226. The upper external spring 218 surrounds the stationary core 200 maintaining pressure on the closed end plate 211 of the stripper sleeve 208 by exerting pressure between the closed end plate 211 and a control arm of a suitable compression molding machine as known in the art. The pressure exerted by the upper external spring 226 is offset by the pressure of the internal spring 224 when the stripper sleeve 208 is in a neutral position.

In the preferred embodiment shown in FIG. 3, stripping of the molded part 204 is achieved by unscrewing the molded part 204 from the male forming mold core 141. The molded part 204 is unscrewed by the conversion of the straight downward vertical motion of the stripper sleeve 208 to a rotational downward motion of the lower rotating stripper bushing 220.

The conversion of vertical motion to rotational motion is started in the present invention when the stripping sleeve 208 begins its vertical motion. The closed end plate 211 exerts motion on an internal collar 210 affixed to the upper rotating bushing 212 which extends down around the internal spring 224 to the lower rotating bushing 220 within the stripper sleeve 208.

In the preferred embodiment shown in FIG. 3, within the stripper sleeve 208, located at the end opposite the lower rotating stripper bushing 220 is an internal collar 210 which rotates within the stripper sleeve 208 about the stationary core 200. The internal collar 210 forms a closed end around the stationary core 200 and is adjacent the interior side of the closed end plate 211 of the stripper sleeve 208.

The internal collar 210 provides a slidable surface between the upper rotating bushing 212 and the interior side of the stationary closed end plate 211 of the stripper sleeve 208. In its preferred embodiment the slidable surface is provided by a ball bearing bushing, however other known methods or devices to ensure that the upper rotating bushing 212 can rotate relative to the stationary closed end plate 211 can be used.

Adjacent the internal collar 210 and extending to the internal spring 224 and down to the lower rotating bushing 220 is an upper rotating bushing 212. The upper rotating bushing 212 has a helix shaped ball bearing race 212A identical to the upper ball bearing race 280 of the stationary core 200. The upper ball bearing race 280 contains ball bearings 212B on which the upper rotating bushing 212 rotates. Significantly, the helix of the upper race is identical in pitch to the threads 270 of the mold forming male core 141.

In the preferred embodiment shown in FIG. 3, the lower rotating striper bushing 220 is located within the tapered end 209 of the stripping sleeve 208 and rotates on a lower ball bearing race 202. The lower ball bearing race 202 is formed of cooperating race halves formed on the lower rotating stripper bushing 220 and adjacent male forming mold core 141. The cooperating race halves contain ball bearings 222 upon which the rotating stripper bushing 220 rotates. Further, the lower ball bearing race 202 is identical in pitch to the threading 270 of the male forming mold core 141.

The lower end of the lower rotating stripper bushing 220 which contacts the molded part 204 further comprises a textured surface, preferably teeth 221 located on the face of the lower rotating stripper bushing 220. These teeth 221 may merely be bumps to achieve friction to engage the molded part 204 and provide rotative motion to the molded part 204 when the stripping sleeve 208 is activated.

In the preferred embodiment shown in FIG. 3, the stripper sleeve 208 is activated by the motion of the stripping cam 214 upon the actuator 204 against the drive collar 205, causing the stripper sleeve 208 to move straight downwardly. The closed end plate 211 pushes the internal collar 210 whereby the upper rotating bushing 212 abutting the internal collar 210 immediately starts to rotate on the upper ball bearing race 280 between the upper rotating bushing 212 and the stationary core 200. As the upper rotating bushing 212 moves along the ball bearing race 280, the attached lower rotating stripper bushing 220 proceeds to rotate on the lower ball bearing race 202. As the stripper sleeve 208 moves to strip the molded part 204 from the male forming mold core 141, the teeth 221 of the lower rotating stripper bushing 220 engage the molded part 204 with circular motion unscrewing the molded part 204 from the thread 270 of the male forming mold core 141, without damaging the threads of the newly molded part 204.

Figure 4A:
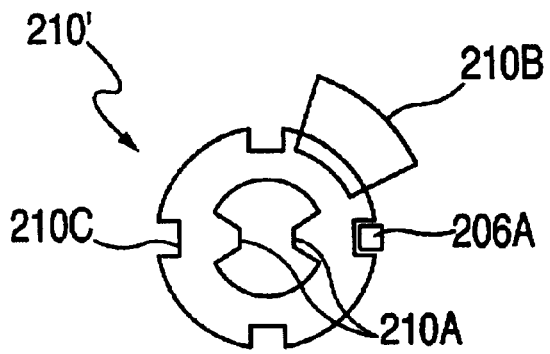
FIG. 4A is a stationary forming pin viewed from above, depicting inner planar splines, exterior planar finger slide fits and a stationary forming pin attachment.
Figure 4:
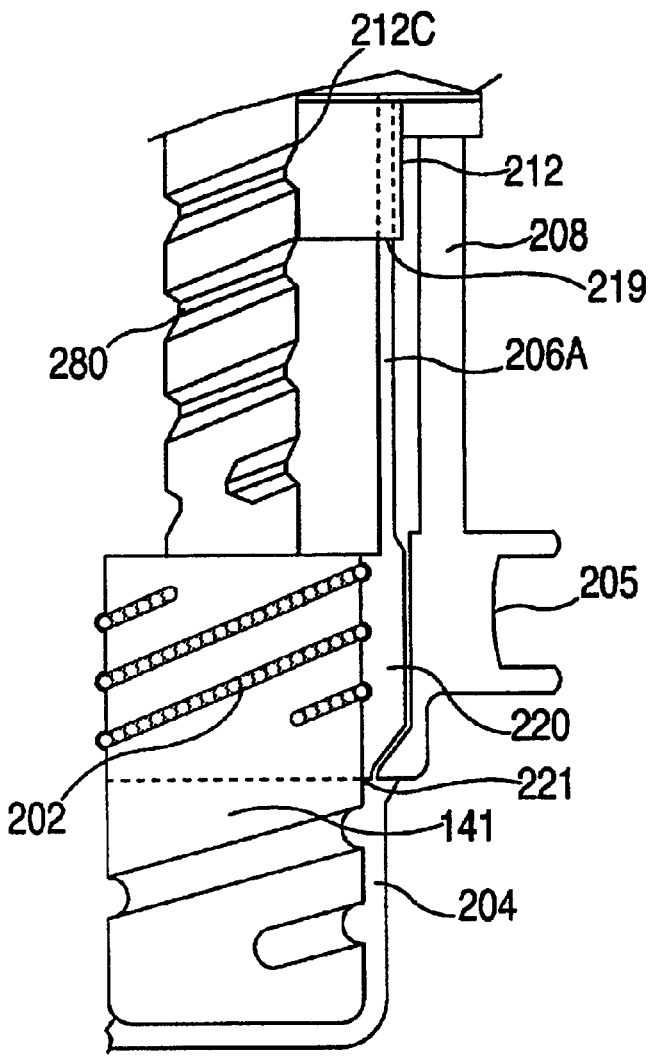
FIG. 4 is an exploded cross-sectional view of an upper mold tooling comprises an embodiment of the present invention, showing a stripper sleeve with a rotating stripper bushing with fingers connected to an upper rotating bushing with splines.

An alternative is shown in FIG. 4, which depicts the internal collar 210 as a thin wall between the interior wall of the stripper sleeve 208 and the stationary forming pin 210' (as shown in FIG. 4A) located within the internal collar 210. The stationary forming pin 210' is shaped like a washer around the stationary core 200. However, the stationary forming pin 210' is fashioned on its interior planar surface to spline 210A within the helix shaped upper indent race 280 of the stationary core 200. The stationary forming pin 210' further comprises attachments 210B in four places to the stripper sleeve 208. The attachments 210B can be engaged or disengaged with the striper sleeve 208.

The stationary forming pin 210' also consists of a plurality of finger slide fits 210C which comprises a cut out area along the exterior planar surface of the stationary forming pin 210'. The finger slide fit 210C provides an area that accepts a finger 206A which comprises a rod like structure adjacent to but not in contact with the interior wall of the stripping sleeve 208. The finger 206A is attached to and extending from the lower rotating striper bushing 220 to the interior side of the closed end plate 211 and within the internal collar 210.

In the preferred embodiment of FIG. 4, an upper rotating bushing 212 is attached to the side of the stationary forming pin 210' which is opposite the closed end plate 211 within the stripping sleeve 208. The attached upper rotating bushing 212 extends from the stationary forming pin 210' to the internal spring 224 and is comprised of slots 219 on its exterior surface adjacent to the interior wall of the stripping sleeve 208. The slots 219 are in alignment with the finger slide fits 210C of the stationary forming pin 210'. Further, the upper rotating bushing 212 is comprised of plurality of splines 212C which fit within the helix shaped upper indent race 280 of the stationary core 200.

As the stationary forming pin 210' is forced along the stationary core 200 through contact with the closed end plate 211, the splines 210A of the interior portion of the stationary forming pin 210' and the splines 212A of the upper rotating bushing 212 follow the helix shaped indent race 280 along the stationary core 200 and begin to rotate. As the stationary forming pin 210' rotates, around the stationary core 200, the fingers 206A which pass through the slots 219 of the upper rotating bushing 212 and the finger slide fits 210C of the stationary forming pin 210' are forced to move in a circular motion, in like manner, the lower rotating stripper bushing 220 is forced to begin a circular motion.

In the preferred embodiment shown in FIG. 4, the lower rotating striper bushing 220 which is located in the tapered end 209 of the stripping sleeve 208 rotates on a lower ball bearing race 202 around the male forming mold core 141 end of the stationary core 200. The ball bearing race 202 of the rotating stripper bushing 220 and male forming mold core 141 contains ball bearings and is identical in pitch to the threading 270 of the male forming mold core 141. The lower rotating stripper bushing 220 further comprises teeth 221 located on the face of the lower rotating stripper bushing 220, used to engage the molded part 204 when the stripping sleeve 208 is activated.

During the compression mold cycle, when the stripping process is started, the teeth 221 of the lower rotating stripping bushing 220 contact the molded part 204 and with circular motion unscrew the molded part 204 from the threading 270 of the male forming mold core 141, without damaging the threads of the newly molded part 204.

In the preferred embodiment show in FIG. 4A, the stationary forming pin 210' is capable of engaging the stripping sleeve 208 through the use of attachments 210B. The attachments 210B of the stationary forming pin 210' when engaged in the wall of the stripping sleeve 208 through the internal collar 210, locks the stripping sleeve 208 to the stationary forming pin 210'. When the attachments 210B are locked in place and the stripping process is started, the stripping sleeve 208 will rotate in unison with the stationary forming pin 210'. This process requires the stripping sleeve 208 to be able to rotate within the grasp of the actuator 204 affixed to the drive collar 205 as the stripping sleeve 208 is moved vertically by the stripping cam 214. In the alternative, when attachments 210B are disengaged from the stripping sleeve 208, as the stripping process proceeds the stripping sleeve 208 moves but does not rotate. In this manner, the stationary forming pin 210', upper rotating bushing 212, fingers 206A, lower rotating stripper bushing 220, teeth 221 and ball bearings 222 within the ball bearing race 202 rotate.

The advantages of a tooling system in accordance with the present invention allow for molded parts that can be customized in thread size and thread angle. Further, compression molding machines can be retro fitted with such a tooling system, and those machines that do not possess the capability or it is undesirable to allow the stripper sleeve to rotate within the actuator can be accommodated.

The unique ability of the present invention to customize the molded parts and to further decrease the cost and increase the efficiency of compression molding machines, sets the present invention apart from the prior art. Those skilled in the art will recognize that changes can be made from the form and detail without departing from the spirit and scope of the invention and that all such changes are intended to be covered, limited only by the appended claims.

I claim:

1. In a mold tool having a core and a stripper sleeve which move in vertical relation to one another for stripping a threaded molded part, the improvement comprising a race on at least one of said core and said stripper sleeve, a rotating stripper bushing which rotates within said stripper sleeve in relation to said race so that the vertical movement between said stripper sleeve and said core results in rotation of said rotating stripper bushing.

2. The mold tool of claim 1, wherein the stripper bushing terminates in a lower face abutting the threaded molded part.

3. The mold tool of claim 1, wherein the lower face of the rotating bushing further comprises a textured surface for engaging the threaded molded part, aiding in the threaded molded part to rotate from said thread on a male forming mold core.

4. The mold tool device of claim 1, wherein said race comprises a helix shaped channel having a pitch identical to a threaded portion of the threaded molded part.

5. The mold tool of claim 4 comprising one or more ball bearings for traveling in said race.

6. The mold tool device of claim 1, wherein said rotating stripper bushing comprises a upper rotating bushing and a lower rotating bushing within said stripper sleeve and a second race such that both said upper and said lower rotating bushings rotate on ball bearing races having an identical helix configuration with the threading on said threaded molded part.

7. The mold tool of claim 6, wherein said lower rotating stripper bushing comprises a plurality of fingers which extend upward to an upper rotating bushing within said stripper sleeve.

8. The mold tool of claim 7, wherein said upper rotating bushing having slots for said fingers to pass through and are attached to a stationary forming pin which comprises finger slide fits that allow said fingers to pass through said stationary forming pin.

9. The mold tool of claim 8, wherein said stationary forming pin with attached upper rotating bushing is surrounded by an internal collar within said stripper sleeve at an end opposite the male forming mold core, said stationary forming pin with attached upper rotating bushing surround said stationary core each having at least one spline which can move along said helix shape upper ball bearing race on said stationary core.

10. The mold tool of claim 9, wherein said stationary forming pin having attachments that engage said stripper sleeve.

11. The mold tool of claim 8, wherein said stationary pin has attachments that do not engage said stripper sleeve.

12. The mold tool of claim 1, wherein said stripper sleeve further comprises a drive collar which is engaged by an actuator to initiate vertical motion of said stripper sleeve in relation to said core, so that the rotating bushing follows the race to provide rotational motion.

13. The mold tool device of claim 1, wherein said stripper sleeve is held in a neutral position by an internal spring and an upper external spring.

* * * * *